United States Patent
Asamizuya et al.

(12) 
(10) Patent No.: US 6,314,576 B1
(45) Date of Patent: Nov. 6, 2001

(54) VIDEO AND AUDIO SIGNAL EDITING AND TRANSMITTING APPARATUS AND METHOD OF SAME

(75) Inventors: Noboru Asamizuya; Norio Ebihara; Yasumasa Kodama, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/794,905

(22) Filed: Feb. 4, 1997

(30) Foreign Application Priority Data

Feb. 7, 1996 (JP) .................................................. 08-021252

(51) Int. Cl.⁷ ..................................................... H04N 7/173
(52) U.S. Cl. ............................... 725/91; 725/92; 725/101; 725/114; 725/115
(58) Field of Search ................................. 345/327; 348/7, 348/12, 13, 9, 10; 455/4.2, 5.1, 6.1, 6.2, 6.3; 725/92, 91, 115, 114, 87, 93, 94, 98, 101, 116; H04N 7/16, 7/173

(56) References Cited

U.S. PATENT DOCUMENTS

| | | | |
|---|---|---|---|
| 5,132,992 | * | 7/1992 | Yurt et al. .............................. 375/122 |
| 5,133,079 | * | 7/1992 | Ballantyne et al. ................... 455/4.1 |
| 5,371,532 | * | 12/1994 | Gelman et al. ........................... 348/7 |
| 5,421,031 | * | 5/1995 | De Bey .................................. 455/5.1 |
| 5,442,390 | * | 8/1995 | Hooper et al. ........................... 348/7 |
| 5,600,364 | * | 2/1997 | Hendricks et al. ...................... 348/1 |
| 5,872,874 | * | 2/1999 | Natarajan .............................. 382/298 |

* cited by examiner

*Primary Examiner*—Chris Grant
(74) *Attorney, Agent, or Firm*—Jay H. Maioli

(57) ABSTRACT

A hardware configuration suited for a digital video and audio signal broadcast system such as a near-video on-demand apparatus (NVOD apparatus) includes a compilation unit, a play-out unit, a transmission unit, and a subscriber unit. The compilation unit stores several weeks to several months worth of the video and audio signals obtained by reproducing, compressing, encoding, and editing the broadcast stock according to a long term broadcast schedule of several weeks to several months. The play-out unit stores the video and audio signals stored in the compilation unit for several days to several weeks according to a broadcast schedule of several days to several weeks, reproduces the video and audio signals which become necessary for the real time broadcast, and adds a time difference to these video and audio signals distributed to a plurality of channels. The transmission unit transmits the plurality of channels worth of the video and audio signals given the time difference at the play-out unit to a subscriber unit.

11 Claims, 4 Drawing Sheets

NVOD TOTAL SYSTEM

NVOD TOTAL SYSTEM

VIDEO AND AUDIO SIGNAL EDITING AND TRANSMITTING APPARATUS AND METHOD OF SAME

BACKGROUND OF THE INVENTION

1. Field of the Invention

The present invention relates to a video and audio signal editing and transmitting apparatus for editing and transmitting video and audio signals, more particularly relates to a video-on-demand (VOD) system which provides a desired program selected from among stored video programs such as movies or other video and audio signals to a subscriber when it is demanded or a near-video-on-demand (NVOD) apparatus, that is, what may be called a simplified version of a video-on-demand (VOD) system.

2. Description of the Related Art

Among the video and audio signal editing and transmitting apparatuses now being developed, mention may be particularly made of the video-on-demand (VOD) apparatuses and the near-video-on-demand (NVOD) apparatuses.

A video-on-demand (VOD) system is a digital two-way dialog type broadcast system which provides a video program such as movie requested by a user (subscriber) to the user at his or her home or other location immediately upon demand. With a video-on-demand (VOD) system, a subscriber would be able to view the video program he or she requested at the time requested via a television receiver at his or her own home etc. The content provided by such a video-on-demand (VOD) system would not be limited to movie programs. It would be possible to provide any picture and audio signals corresponding to that picture as well. In the following description, however, reference will be mainly made to the broadcast of a movie program as typical example of the content.

A video-on-demand (VOD) system is supposed to allow a large number of subscribers to request the programs they desire at any time, therefore the amount of the data in the video and audio signals transmitted from the broadcasting station to the subscribers would become enormous. As a result, the transmission capacity of the transmission path and the data processing ability at the broadcasting station side would both have to be large. If the number of the subscribers becomes too large and requests are made from too many subscribers at the same time, there is a good chance that disadvantages would occur in terms of the response time. Of course, installation of a large number of apparatuses capable of performing high speed processing would enable all of these requests to be responded to instantaneously, but this would make the overall system extremely expensive.

To overcome these disadvantages anticipated in video-on-demand (VOD) systems, a near-video-on-demand (NVOD) system has been proposed as a more practical version of a video-on-demand (VOD) system. In a near-video-on-demand (NVOD) system, the same program is sent over a number of channels staggered in time. By selecting from among these channels, it is possible to provide the subscriber with his or her desired program after a short wait or to even allow the subscriber to view the program from a later part he or she particularly desires to see.

While a near-video-on-demand (NVOD) system does not have the instantaneous response time of a video-on-demand (VOD) system in the strict sense of the term, a user can for example start viewing the program he or she desired after just waiting for 10 to 15 minutes at the most after he or she makes the request when the program is sent at 10 or 15 minute time intervals. Therefore, there is no disadvantage in terms of practical use. Further, there are the advantages that realization of such a near-video-on-demand (NVOD) system requires a much simpler configuration of hardware than realization of a video-on-demand (VOD) system and that the processing speed does not have to be as fast as with a video-on-demand (VOD) system.

Further, if a subscriber views the content of a certain program up to the middle of the program and then has to stop for some reason or another, as stated above, he or she can resume viewing the program from the middle by just selecting from among the channels over which the program is being broadcast. Therefore, there is the additional advantage that the subscriber need not view a program at a single long sitting and can stop it midway and can resume viewing from a desired portion later, that is, can view it just like viewing a program recorded on a video tape at a home video cassette recorder.

One of the easiest ways to realize a video on-demand (VOD) system or a near-video on-demand (NVOD) system would be to connect a plurality of digital compression and encoding apparatuses at the transmission stage of a conventional broadcasting system, input their outputs to a digital multiplexing device, and broadcast the result through a modulating device and transmitting device.

However, when adopting such a method for a near-video-on-demand (NVOD) apparatus, it suffers from the disadvantage that the same number of transmission portions of the conventional broadcasting system and the same number of digital compression and encoding devices as the number of the multiple channels become necessary, therefore the entire system would become large in size and, at the same time, the price would become high.

Further, in the conventional hardware configuration, the hardware as a whole is designed for providing near-video-on-demand NVOD service. The functions of the system as a whole are not suitably broken down and the components are not separated. Therefore, this configuration is not suited to partial modification or replacement of the hardware.

Note that while the related art was described with reference particularly to a video-on-demand (VOD) system or a near-video-on-demand (NVOD) system, there are similar disadvantages in also other video and audio signal editing and transmitting apparatuses performing similar processing to these systems.

SUMMARY OF THE INVENTION

An object of the present invention is to provide a near-video on-demand (NVOD) apparatus which is simple in configuration and enables modification and partial replacement of the hardware configuration.

Another object of the present invention is to provide a near-video-on-demand (NVOD) compilation apparatus which can be preferably applied to a near-video-on-demand (NVOD) apparatus.

Still another object of the present invention is to provide a near-video-on-demand (NVOD) play-out apparatus which can be preferably applied to a near-video-on-demand (NVOD) apparatus.

Still another object of the present invention is to provide a transmission apparatus which can be preferably applied to a near-video-on-demand (NVOD) apparatus.

Still another object of the present invention is to provide a near-video-on-demand (NVOD) subscriber apparatus which can be preferably applied to a near-video-on-demand (NVOD) apparatus.

Still another object of the present invention is to provide a hardware configuration which can be applied to a simple configuration video-on-demand (VOD) apparatus.

Still another object of the present invention is to provide a hardware configuration which can be applied to a simple configuration video and audio signal editing and transmitting apparatus.

According to the present invention, there is provided a video and audio signal editing and transmitting apparatus provided with a compilation unit which has a first storage means, receives original video signals serving as video stock and original audio signals corresponding to the original video signals, compresses and encodes the received signals, performs predetermined editing on the compressed and encoded digital video and audio signals, stores the results in the first storage means, and transmits the digital compressed and encoded video and audio signals stored in the first storage means in accordance with a first transmission request; a play-out unit which has a second storage means having a smaller capacity than the storage capacity of the first storage means, receives the digital compressed and encoded video and audio signals transmitted from the compilation unit, stores them in the second storage means, reads and reproduces the digital compressed and encoded video and audio signals from the second storage means in accordance with a second transmission request, and transmits the reproduced digital video and audio signals; and a transmission unit which transmits the reproduced digital video and audio signals transmitted from the play-out unit to subscribers according to the broadcast schedule.

The video and audio signal editing and transmitting apparatus of the present invention may be further provided with a subscriber unit having an instruction means which is connected to the transmission unit for selecting a program to be received from the transmission unit and a receiving means for receiving and decoding the digital video and audio signals transmitted from the transmission unit.

When the video and audio signal editing and transmitting apparatus is used as a near-video-on-demand (NVOD) apparatus, the play-out unit copies the continuous video and audio signals to a plurality of channels of the video and audio signals, successively adds a predetermined time difference to these plurality of channels of video and audio signals, and transmits the same to the transmission unit. The transmission unit transmits the plurality of channels of the video and audio signals given the time difference to the subscriber unit.

Further, according to the present invention, there is provided a compilation apparatus able to be applied to a video and audio signal editing and transmitting apparatus, in particular, a video-on demand (VOD) apparatus or a near-video-on-demand (NVOD) apparatus.

The compilation apparatus is provided with an encoder for compressing and encoding the video and audio signals of the program to be broadcasted; a storage means for storing the compressed and encoded video and audio signals for several weeks to several months worth of broadcasts according to the broadcast schedule; a data transmitting means for transmitting the compressed and encoded video and audio signals stored in the storage means to an external portion in accordance with a transmission request; and a compilation system controller for controlling the encoder, the storage means, and the data transmitting means.

According to the present invention, there is also provided a play-out apparatus able to be applied to a near-video-on-demand (NVOD) apparatus.

The near-video-on-demand (NVOD) play-out apparatus is provided with a recording means for recording the compressed and encoded broadcast-use video and audio signals; a signal distributing means for reading the video and audio signals stored in the storage means in accordance with a request and distributing the same to a plurality of channels; a reproducing means for reproducing the compressed and encoded video and audio signals distributed to the plurality of channels and successively giving a time difference to these reproduced plurality of channels worth of video and audio signals; a switching means for switching the plurality of compressed and encoded video and audio signals which are reproduced and given the time difference based on a switching request; and a play-out system controller for controlling the recording means, the signal distributing means, and the reproducing means in accordance with the broadcast content.

According to the present invention, there is further provided a transmission apparatus able to be applied to a near-video-on-demand (NVOD) apparatus.

The transmission apparatus is provided with a switching means for switching the plurality of channels worth of compressed and encoded video and audio signals successively given a time difference in accordance with a broadcast request; a first multiplexing means for multiplexing the switched plurality of channels worth of compressed and coded video and audio signals for a satellite broadcast; a first modulating means for modulating the video and audio signals multiplexed by the first multiplexing means for the satellite broadcast; a first transmitting means for transmitting the modulated video and audio signals modulated by the first modulating means toward an antenna; a second multiplexing means for multiplexing the switched plurality of channels worth of compressed and coded video and audio signals for a cable broadcast; a second modulating means for modulating the video and audio signals multiplexed by the second multiplexing means for a cable broadcast; and a second transmitting means for transmitting the modulated video and audio signals modulated at the second modulating means via a cable.

Further, according to the present invention, there is provided a near-video-on-demand (NVOD) subscriber apparatus connected by electromagnetic waves or connected by cable to the transmission apparatus.

The near-video-on-demand (NVOD) subscriber apparatus is provided with a receiving means for receiving the plurality of channels worth of compressed and coded video and audio signals transmitted from the transmission apparatus and a decoding means for decoding the received video and audio signals.

Further, according to the present invention, there is provided a video and audio editing and transmitting method.

The video and audio editing and transmitting method is provided with the following steps, that is, a step of receiving original video signals serving as video stock and original audio signals corresponding to the original video signals and compressing and encoding the received signals; a step of performing predetermined editing on the compressed and encoded digital video and audio signals and storing them in a first storage means; a step of transmitting the digital compressed and encoded video and audio signals stored in the first storage means in accordance with a first transmission request; a step of receiving the transmitted digital compressed and encoded video and audio signals and storing the same in a second storage means having a smaller capacity than the storage capacity of the first storage means;

a step of reading and reproducing the digital compressed and encoded video and audio signals from the second storage means in accordance with a second transmission request and transmitting the reproduced digital video and audio signals; and a step of transmitting the transmitted reproduced digital video and audio signals to the subscribers according to a broadcast schedule.

BRIEF DESCRIPTION OF THE DRAWINGS

These and other objects and features of the invention will become clearer from the following description of the preferred embodiments made with reference to the attached drawings, in which.

DESCRIPTION OF THE PREFERRED EMBODIMENTS

An example of a near-video-on-demand (NVOD) apparatus will be described as a first embodiment of the video and audio signal editing and transmitting apparatus of the present invention.

In this specification, video information or video signals mean not only pure video signals, but also the audio signals related to the pure video signal as in a movie and television broadcast program etc., that is, both of the audio signal and video signal, that is, an AV signal. Below, a video signal and audio signal will be abbreviated as an "AV signal".

Overall Configuration

Figure 1:
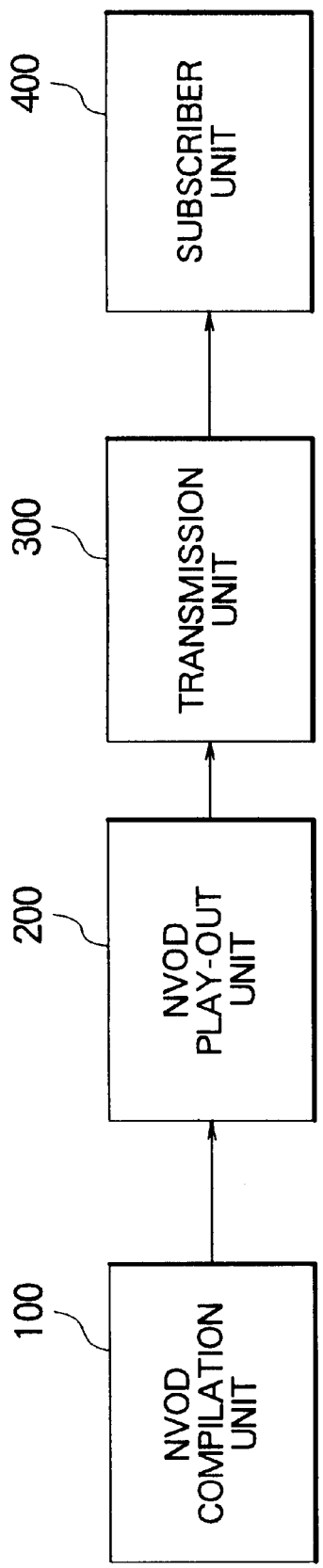
FIG. 1 is a view of the overall configuration of a near-video on-demand (NVOD) apparatus according to a first embodiment of a video and audio signal editing and transmitting apparatus of the present invention.

FIG. 1 is a view of the overall configuration of a near-video-on-demand (NVOD) apparatus of a first embodiment of a video and audio signal editing and transmitting apparatus of the present invention.

A near-video-on-demand (NVOD) apparatus 1 is constituted by a near-video-on-demand (NVOD) compilation unit 100, a near-video-on-demand (NVOD) play-out unit 200, a transmission unit 300, and a near-video-on-demand (NVOD) subscriber unit 400.

The near-video-on-demand (NVOD) compilation unit 100, the near-video-on-demand (NVOD) play-out unit 200, and the transmission unit 300 are disposed on for example the side providing the near-video-on-demand (NVOD) program, for example, the broadcasting station. The near-video-on-demand (NVOD) subscriber unit 400 is the apparatus installed at the home or other premise of the subscriber utilizing the near-video-on-demand (NVOD) service.

In the embodiment of the present invention, for example, the hardware (equipment) installed at the broadcasting station is divided into the near-video-on-demand (NVOD) compilation unit (apparatus) 100, the near-video-on-demand (NVOD) play-out unit (apparatus) 200, and the transmission unit (apparatus) 300. Therefore, the processing is suitably dispersed, the overall hardware configuration is suitably assembled, and the hardware configuration is made flexible and simple so as to enable various requests and modifications to be handled when realizing the near-video-on-demand (NVOD) system. Details of this will be explained below when describing the details of each component.

Below, a description will be made of the general operation of the components of the near-video-on-demand (NVOD) apparatus 1.

Figure 2:
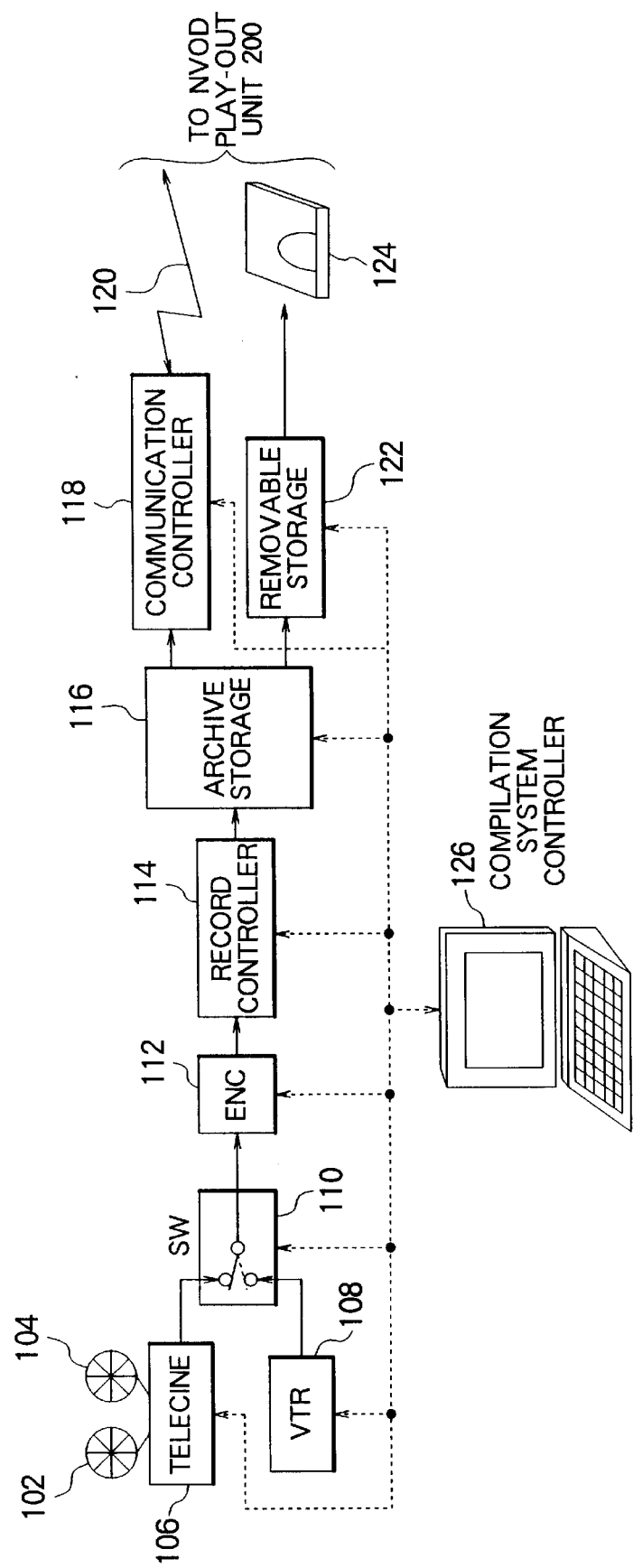
FIG. 2 is a view of the configuration of the near-video-on-demand (NVOD) compilation unit shown in FIG. 1.

The near-video-on-demand (NVOD) compilation unit 100 converts video stock such as movies in advance into a digital data format, in view of the broadcast format, according to the long term broadcast schedule (broadcast programs) for the next several weeks to several months, edits it, and stores the same in a large capacity digital storage (first recording means comprising a record controller 114 and an archive storage 116 of FIG. 2). Accordingly, the first storage means is a large capacity digital storage capable of storing AV signals for several weeks to several months of broadcasts. The near-video-on-demand (NVOD) compilation unit 100 transmits the AV signals recorded in the first recording means to the near-video-on-demand (NVOD) play-out unit 200 in accordance with the broadcast schedule or a request from the near-video-on-demand (NVOD) play-out unit 200.

Figure 3:
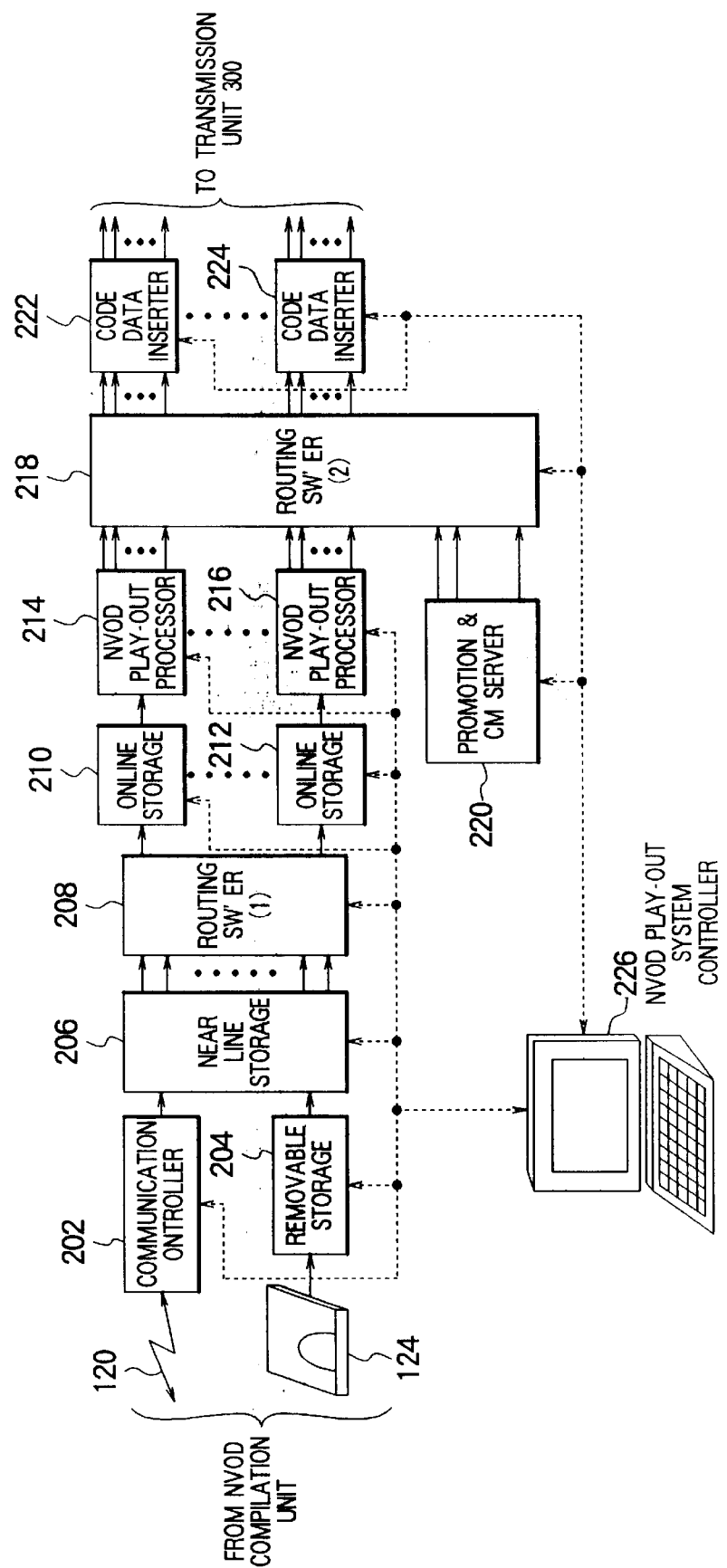
FIG. 3 is a view of the configuration of the near-video-on-demand (NVOD) play-out unit shown in FIG. 1.

The near-video-on-demand (NVOD) play-out unit 200 stores several days to several weeks worth of the AV signals of the video information transmitted from the near-video-on-demand (NVOD) compilation unit 100 in another large capacity digital storage (second recording means comprising near line storage 206 of FIG. 3). Accordingly, the second storage means is a large capacity digital storage capable of storing several days to several weeks worth of the AV signals. The AV signals stored in the second storage means are transferred to an on-line storage (third storage means comprising a plurality of on-line storages 210 to 212) in the near-video-on-demand (NVOD) play-out unit 200 according to the broadcast schedule. Then, according to the broadcast schedule, the video information transferred to the on-line storage is reproduced for multiple channels with a time difference and transmitted to the transmission unit 300.

The transmission unit 300 multiplexes several channels of the plurality of channels of video information given the time difference transmitted from the near-video-on-demand (NVOD) play-out unit 200, modulates this, and transmits the same to the near-video-on-demand (NVOD) subscriber unit 400.

The subscriber at the near-video-on-demand (NVOD) subscriber unit 400 indicates his or her desired video information from among the multiple channels of video information transmitted from the transmission unit 300 to cause it to be displayed on the television receiver or the like. In certain cases, the company collecting the reception fee on behalf of the broadcaster monitors the state of reception by the subscriber through an upstream signal or other communication means to determine the charges.

Charges of memory are naturally incurred along with the utilization of the near-video-on-demand (NVOD) service, but the charging system is not described in the above configuration. In the near-video-on-demand (NVOD) apparatus of the embodiments of the present invention, however, various known charging systems can be adopted. For example, a charging system such as in a cable type broadcast system such as a CATV system can be applied.

The relationship among the first storage means (the record controller 114 and archive storage 116 shown in FIG. 2) in the near-video-on-demand (NVOD) compilation unit 100, the second storage means (near line storage 206 of FIG. 3) in the near-video-on-demand (NVOD) play-out unit 200, and the third storage means (plurality of on-line storages 210 to 212 of FIG. 3) will be explained next.

The first storage means (archive storage 116 of FIG. 1) in the near-video-on-demand (NVOD) compilation unit 100 stores the programs to be edited in advance according to a long term broadcast schedule of several weeks to several months.

Note that to enable high efficiency storage of a large amount of AV signals in the first storage means, the data is compressed and encoded at the encoder 112 so as to greatly reduce the amount of the data.

The second storage means (near line storage 206 of FIG. 3) in the near-video-on-demand (NVOD) play-out unit 200 stores the AV signals of the broadcast programs which are scheduled to be broadcast in several days to several weeks. The second storage means also stores compressed and encoded AV signals.

The third storage means (plurality of on-line storages 210 to 212 of FIG. 3) in the near-video-on-demand (NVOD) play-out unit 200 temporarily stores the AV signals of the programs to be broadcasted at present among the AV signals stored in the second storage means. The third storage means also stores compressed and encoded AV signals.

The hierarchization of the storage means in accordance with the magnitude of the storage capacity and objective of use as described above enables the design of suitable storage capacities, an increase of the speed of the storage and reading, ease of management of storage, and other more efficient management of storage and processing according to the objective of use.

Further, the hierarchization of the storage means described above enables the separation of the components in the near-video-on-demand (NVOD) apparatus. For example, the first storage means in the near-video-on-demand (NVOD) compilation unit 100 stores broadcast use AV signals for a long period of up to several weeks to several months and cannot be placed near the near-video-on-demand (NVOD) subscriber unit 400 to which the AV signals must be provided on-line. Accordingly, a near-video-on-demand (NVOD) compilation unit 100 is provided disposed in a central broadcasting station commonly with respect to a plurality of near-video-on-demand (NVOD) play-out units 200 and stores several weeks to several months of the AV signals for each of the plurality of near-video-on-demand (NVOD) play-out units 200. Further, it is also possible to provide a duplicate first storage means to enhance the reliability of the stored data.

The second storage means in the near-video-on-demand (NVOD) play-out unit 200 receives as input several days to several weeks worth of the broadcast use AV signals in advance every several days to several weeks from the first storage means of the near-video-on-demand (NVOD) play-out unit 100 according to the broadcast schedule and stores them in advance. Further, it is possible to provide a duplicate second storage means to enhance the reliability of the stored data. In this case, the second storage means has a smaller size than the first storage means, therefore even if there are a plurality of near-video-on-demand (NVOD) play-out units 200, the duplexing of the second storage means in each near-video-on-demand (NVOD) play-out unit 200 is not that heavy a load economically speaking.

As explained referring to FIG. 2 and FIG. 3, in the present embodiment, a case of using a communication line 120 or a portable recording medium 124 for transferring the AV signals stored in the first storage means (archive storage 116) to the second storage means is shown.

The third storage means in the near-video-on-demand (NVOD) play-out unit 200 exists near the near-video-on-demand (NVOD) subscriber unit 400 and temporarily stores the AV signals of the broadcast program to be broadcasted for the playback. Accordingly, the third storage means is desirably placed near the near-video-on-demand (NVOD) subscriber unit 400. Since the third storage means temporarily stores the AV signals to be broadcasted at present, even if the AV signal is transmitted out, it is possible to read the AV signal for the next broadcast from the second storage means, therefore it is not particularly necessary to provide a duplicate third storage means.

For reasons relating to the data transmission, the third storage means is desirably placed near the near-video-on-demand (NVOD) subscriber unit 400. Accordingly, desirably the third storage means is placed near the transmission unit 300 at the terminal of the near-video-on-demand (NVOD) apparatus 1.

The second storage means in the near-video-on-demand (NVOD) play-out unit 200 can be disposed somewhere between the positions of the first storage means and the third storage means.

The present embodiment shows a case where the second storage means (near line storage 206) and the third storage means (plurality of on-line storages 210 to 212) are provided in the same near-video-on-demand (NVOD) play-out unit 200. The reason for this is to avoid complicating the overall configuration where the near-video-on-demand (NVOD) play-out unit 200 is designed as a separate unit as in the present embodiment. However, for certain other configurations of the near-video-on demand (NVOD) apparatus, it would be possible to divide the near-video-on-demand (NVOD) play-out unit 200 part into two, that is, a part before the near line storage 206 and a part after the plurality of on-line storages 210 to 212.

In the near-video-on-demand (NVOD) apparatus 1, the compressed and encoded digital AV signals flow according to the MPEG2 standard, which is now becoming the universal standard for image data compression, over the near-video-on-demand (NVOD) compilation unit 100 to the near-video-on-demand (NVOD) subscriber unit 400. In this way, by using AV signals compressed and encoded with the unified standard in the entire near-video-on-demand (NVOD) apparatus 1, standardization of the signal processing, sharing (standardization) of the hardware, and maintenance of the compatibility are achieved.

Details of the components of the near-video-on-demand (NVOD) apparatus 1 will be explained below.

Near-Video-on-Demand (NVOD) Compilation Unit

FIG. 2 is a view of the detailed configuration of the near-video-on-demand (NVOD) compilation unit 100.

The near-video-on-demand (NVOD) compilation unit 100 edits and compresses film stock such as video film or video stock recorded on video tape, stores them for a long period, and transmits the required video information to the near-video-on-demand (NVOD) play-out unit 200 in accordance with the broadcast.

The near-video-on-demand (NVOD) compilation unit 100 has a film stock conversion device (device called "Telecine") 106 which reads the movie of the film stock recorded on the films 102 and 104 and converts the same to video signals and audio signals, that is, AV signals.

Further, the near-video-on-demand (NVOD) compilation unit 100 has a video signal reproducing apparatus (VTR) 108 for reproducing the analog or digital AV signals recorded on video tape (referred to as "VTR stock").

The near-video-on-demand (NVOD) compilation unit 100 has a switching circuit 110 for selecting the signal from the film stock conversion device 106 or the signal from the video signal reproducing apparatus (VTR) 108.

After the switching circuit 100 is provided an encoding device (encoder) 112. The encoder 112 compresses and encodes the video signals and audio signals of the film stock or the VTR stock input via the switching circuit 110 based on the MPEG2 standard. Accordingly, the signal after the encoder 112 is a digital AV signal compressed and encoded by the MPEG2 standard.

The near-video-on-demand (NVOD) compilation unit 100 further has the above large capacity storage means, that is, the record controller 114 and the archive storage 116, as the first storage means.

The near-video-on-demand (NVOD) compilation unit 100 has a communication controller 118 which transmits the AV signals recorded in the archive storage 116 through the communication path 120 and a removable storage 122 for storing the AV signals recorded in the archive storage 116 on a recording medium 124.

Further, the near-video-on-demand (NVOD) compilation unit 100 has a near-video-on-demand (NVOD) compilation system controller 126 for controlling the operation of the components explained above. The near-video-on-demand (NVOD) compilation system controller 126 is realized by a personal computer system.

In the following description, the MPEG2 standard is used for the compression and encoding. As the video signal, audio signal, and code data, a transport stream (TS) of the MPEG2 standard is used.

The compilation system controller 126 biases the switching circuit 110 so that the film stock conversion device 106 is selected when editing is carried out by using the film stock and so that the video signal reproducing apparatus (VTR) 108 is selected when the editing is carried out by using the VTR stock based on a long term broadcast schedule of several weeks to several months set by the user. The signals from the selected apparatus are supplied to the encoder 112. For instance, when editing the AV signals from the film stock, the compilation system controller 126 biases the switching circuit 110 to enable the operation of the film stock conversion device 106 and have the digital AV signals converted at the film stock conversion device 106 input to the encoder 112. Conversely, when editing the AV signals from the VTR stock, the compilation system controller 126 biases the switching circuit 110 to enable the operation of the video signal reproducing apparatus (VTR) 108 and have the digital AV signals reproduced at the VTR 108 input to the encoder 112.

The encoder 112 performs the compression and encoding for the input digital AV signals selected at the switching circuit 110 according to the control of the compilation system controller 126. Accordingly, the AV signals output from the encoder 112 to the record controller 114 are digital AV signals compressed and encoded by the MPEG2 standard.

The encoder 112, when necessary, multiplexes packets of the video signals, audio signals, and code data in the form of code data packets to be inserted when transmitting the data from the near-video-on-demand (NVOD) compilation unit 100 to the near-video-on-demand (NVOD) play-out unit 200 in advance and outputs the same in the form of a transport stream (TS) of the MPEG2 standard.

The "code data" means the data of the information indicating what channel broadcasts what program, information for the text broadcasts, subtitles, etc. This code data is inserted into the AV signal in a plurality of code data insertion circuits 222 to 224 in the near-video-on-demand (NVOD) play-out unit 200 explained later referring to FIG. 3.

The record controller 114 performs the control for storing the digital compressed and encoded AV signals transmitted from the encoder 112 in the archive storage 116.

The archive storage 116 is a large capacity digital storage for storing several months of video programs for a long period in advance based on a long term broadcast schedule in the near-video-on-demand (NVOD) apparatus. The archive storage 116 is constituted by using a combination of a digital data recorder and auto-changer for recording and reproducing the digital AV signals on for example a magnetic tape or using a removable medium such as an auto-changer using a magneto-optical (MO) disc recording medium.

The record controller 114 stores the digital AV signals transmitted from the encoder 112 in the archive storage 116 based on a command from the compilation system controller 126.

Preferably, the record controller 114 edits the data so as to obtain a signal storage format efficient for highly efficient reading from the archive storage 116 and signal processing at the time of the broadcast in accordance with the time difference during staggered reproduction for several channels in the near-video-on-demand (NVOD) system instructed from the compilation system controller 126 and makes the archive storage 116 store this. When editing and storing the video and audio signals in the archive storage 116 in this way, when the data is read from the archive storage 116 and reproduced via the near-video-on-demand (NVOD) play-out unit 200, staggered playback for multiple channels becomes possible by just repeating a sequential playback.

When applying the near-video-on-demand (NVOD) compilation unit 100 not to a near-video-on-demand (NVOD) apparatus, but to a video-on-demand (VOD) apparatus, it is sufficient to transmit different AV signals to a plurality of channels rather than the same AV signal to multiple channels with a time difference.

The communication controller 118 fetches a corresponding program stored in the archive storage 116 according to a request from the broadcast side or an instruction from the near-video-on-demand (NVOD) play-out unit 200, that is, the compilation system controller 126 receiving an instruction for supply at the program supply side, and transmits the same via the communication path 120 to the near-video-on-demand (NVOD) play-out unit 200.

The communication speed of the communication line 120 is governed by the speed of reading the AV signals from the archive storage 116, the transmission speed of the communication line 120, and the reception speed of the near-video-on-demand (NVOD) play-out unit 200, in other words, the slowest speed of the recording speed of the recording medium in the near-video-on-demand (NVOD) play-out unit 200. The transmission rate of the MPEG2-TS is 4 to 6 Mbps, therefore if a high speed communication medium is used as the communication line 120, a considerably high speed communication becomes possible.

The removable storage 122 is a removable storage device which does not transmit the AV signals to the near-video-on-demand (NVOD) play-out unit 200 via the communication lines 120, but stores the digital AV signals in a removable recording medium 124 such as an MO disc or digital tape based on a command from the compilation system controller 126 and provides the same to the near-video-on-demand (NVOD) play-out unit 200.

The compilation system controller 126 controls the operation of the components of the near-video-on-demand (NVOD) compilation unit 100 as mentioned above and as illustrated in FIG. 2.

The near-video-on-demand (NVOD) compilation unit 100 compresses and encodes the film stock from the film stock conversion device 106 or VTR stock from the video signal reproducing apparatus (VTR) 108 by the MPEG2 standard as mentioned above to store about several weeks to several months of broadcast content and provides the required content when it is requested on the near-video-on-demand (NVOD) play-out unit 200 side or the like.

Near-Video-on-Demand (NVOD) Play-Out Unit

A description will be made next of the near-video-on-demand (NVOD) play-out unit 200 arranged at the program supply side referring to FIG. 3.

First, the configuration of the near-video-on-demand (NVOD) play-out unit 200 will be explained.

The near-video-on-demand (NVOD) play-out unit 200 has a communication controller 202, a removable storage 204, a near line storage 206, a first routing switching circuit 208, plurality of on-line storages 210 to 212, a plurality of near-video-on-demand (NVOD) play-out processors 214 to 216, a second routing switching circuit 218, a promotion and CM server 220, a plurality of code data insertion circuits 222 to 224, and the near-video-on-demand (NVOD) play-out system controller 226 for controlling the operation of the componentss mentioned above.

The content of the broadcast programs is transmitted from the near-video-on-demand (NVOD) play-out unit 200 to the transmission unit 300 with a time difference over multiple channels according to the broadcast schedule. The near-video-on-demand (NVOD) play-out system controller 226 controls the components in the near-video-on-demand (NVOD) play-out unit 200 according to the broadcast schedule and operates so that the signals are reproduced and output for multiple channels with a time difference from a plurality of code data insertion circuits 222 to 224.

The communication controller 202 receives the AV signals transmitted via the communication path 120 of the near-video-on-demand (NVOD) compilation unit 100 under the control of the near-video-on-demand (NVOD) play-out system controller 226.

The removable storage 204 reads the AV signals recorded on the recording medium 124 from the recording medium 124 by the removable storage 122 of the near-video-on-demand (NVOD) compilation unit 100 under the control of the near-video-on-demand (NVOD) play-out system controller 226.

The near line storage 206 stores about several days to several weeks worth of the AV signals transmitted from the communication controller 202 or the removable storage 204 under the control of the near-video-on-demand (NVOD) play-out system controller 226 to which a command is given from the user based on a medium term broadcast schedule of several days to several weeks and the broadcast schedule near the broadcasting. Further, the near line storage 206 transmits the AV signals stored as described above, that is, the AV signals for which the broadcast schedule is approaching, to the first routing switching circuit 208 according to the command of the near-video-on-demand (NVOD) play-out system controller 226. The first routing switching circuit 208 transmits the AV signals transmitted from the near line storage 206 to the corresponding part of one of the plurality of on-line storages 210 to 212 based on the command of the near-video-on-demand (NVOD) play-out system controller 226.

Each of the plurality of on-line storages 210 to 212 has a capacity for storing the AV signals transmitted according to the broadcast schedule and the AV signals to be transmitted next. Note that, where the programs to be broadcasted are rearranged, the plurality of on-line storages 210 to 212 are controlled by the near-video-on-demand (NVOD) play-out system controller 226 so as to store the AV signals so that the staggered playback can be carried out for the multiple channels while recording a new program.

The near line storage 206, the first routing switching circuit 208, and the plurality of on-line storages 210 to 212 can be integrally constituted. Namely, the near line storage 206 is a recording device for storing several days to several weeks of broadcast of the AV signals, the first routing switching circuit 208 is the switching circuit for selecting the AV signals stored in the near line storage 206 and outputting them, and the plurality of on-line storages 210 to 212 are recording devices for storing only the amount of the AV signals stored in the near line storage 206 that is to be transmitted in accordance with the broadcast and the AV signals to be transmitted next, therefore the storage and call up of the AV signals may be carried out for the above objectives by providing a large scale storage device.

To reproduce and output the AV signals giving a time difference to the corresponding channels, each of the plurality of near-video-on-demand (NVOD) play-out processors 214 to 216 controls the corresponding on-line storage of the on-line storages 210 to 212 provided in the front thereof (by controlling the integral storage device where the near line storage 206, the first routing switching circuit 208, and plurality of on-line storages 210 to 212 are integrally formed as mentioned above) to reproduce the AV signals giving a time difference. As explained referring to the part of the near-video-on demand (NVOD) compilation unit 100, when the data is recorded in a format that is convenient for playback with a time difference in advance at the time of the recording, it is sufficient that sequential playback be repeated. However, when the data is continuously recorded without considering the playback with a time difference, the AV signals are reproduced while after a time interval equal to the amount of the time difference.

The reproduction timing in the plurality of near-video-on-demand (NVOD) play-out processors 214 to 216 and the switching with the novel AV signal are carried out based on the control commands of the near-video-on-demand (NVOD) play-out system controller 226.

The promotion and CM server 220 is a device which outputs promotional video information or commercial (CM) video information for inserting the same into the AV signals output from the plurality of near-video-on-demand (NVOD) play-out processors 214 to 216. The promotional video or commercial (CM) video information is also processed by the MPEG2 standard and stored in the form of a transport stream (TS) of the MPEG2 standard.

Whether or not the promotional video information or commercial (CM) video information is to be transmitted from the promotion and CM server 220 is determined according to the command of the near-video-on-demand (NVOD) play-out system controller 226.

The second routing switching circuit 218 performs the switching between the movie program transmitted from the plurality of near-video-on-demand (NVOD) play-out processors 214 to 216 and the promotional video information or commercial (CM) video information transmitted from the promotion and CM server 220 according to the control command of the near-video-on-demand (NVOD) play-out system controller 226 and transmits the same to the plurality of code data insertion circuits 222 to 224.

In the second routing switching circuit 218, the digital compressed AV signals output from the plurality of near-video-on-demand (NVOD) play-out processors 214 to 216 are synchronized in frame and matched in phase as groups of pictures (GOP), the unit for accommodating a plurality of video signals prescribed by the MPEG2 standard, so as to prevent an abnormal frame being generated at the switching point. At this time, however, a closed GOP becomes necessary for the GOP at the start of the video to be switched. However, if the last part of the video to be switched and the leading one to two frames of the video to be switched are set as black images, it is not necessary to attach a closed GOP. Further, even if GOP phase matching is not carried out, if it is indicated that the GOP at the start of the video to be switched is a broken link, the playback becomes possible without a disadvantage in the subscriber use decoder.

Each of the plurality of code data insertion circuits 222 to 224 inserts the code data into the broadcast use data transmitted from the second routing switching circuit 218 in accordance with the command of the near-video-on-demand (NVOD) play-out system controller 226.

The output signals transmitted from the code data insertion circuits 222 to 224 are transmitted in the form of an MPEG2 standard transport stream (TS).

The "code data" means the information indicating for example what channel broadcasts what program, information for text broadcasts, subtitles, and other data.

The insertion of the code data is carried out in accordance with the content thereof.

When code data use packets are prepared in advance in the encoder 112 in the form of multiplexed packets of the video signals, audio signals, and code data in a form of code data packets to be inserted when transmitting the data from the near-video-on-demand (NVOD) compilation unit 100 to the near-video-on-demand (NVOD) play-out unit 200 as explained above, the plurality of code data insertion circuits 222 to 224 insert the code data into those packets.

By the above operation, in the near-video-on-demand (NVOD) play-out unit 200 shown in FIG. 3, the contents of the program to be broadcasted according to the broadcast schedule are given code data according to need and transmitted to the transmission unit 300 with a time difference given to the plurality of channels worth of the video and audio signals according to the format of the MPEG2-TS.

Transmission Unit and Subscriber Unit

Figure 4:
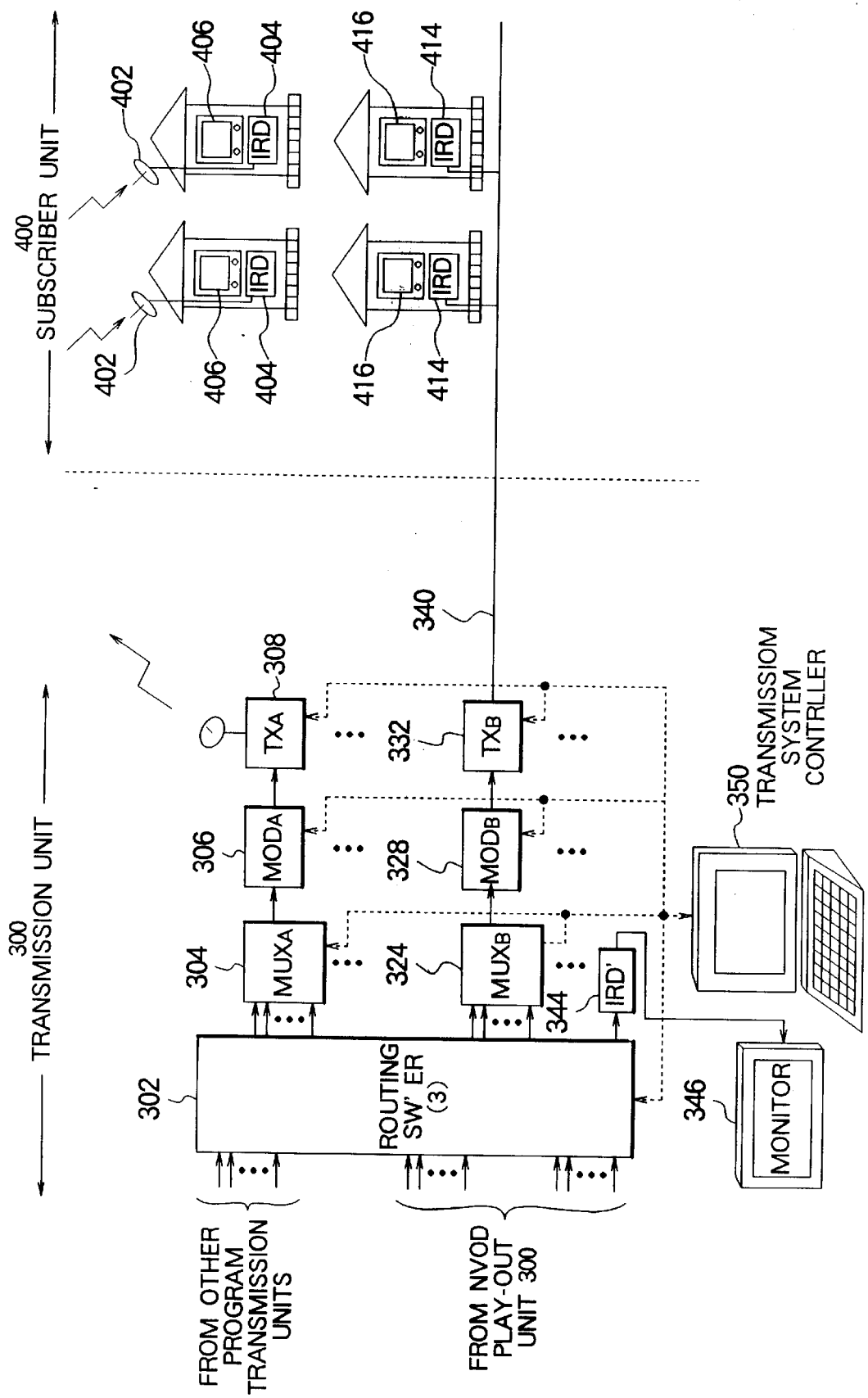
FIG. 4 is a view of the configuration of a transmission unit and a subscriber unit shown in FIG. 1.

The transmission unit 300 and the subscriber unit 400 will be explained next referring to FIG. 4. The transmission unit 300 is constituted so as to be able to perform both a satellite broadcast and digital CATV broadcast.

The transmission unit 300 has a third routing switching circuit 302.

The transmission unit 300 has a plurality of satellite broadcast use multiplexing devices 304 (only one is illustrated as a representative one due to the limitations of illustration), a plurality of satellite broadcast use modulators 308 (only one is illustrated as a representative one due to the limitations of illustration), and a plurality of satellite broadcast use transmission devices 312 (only one is illustrated as a representative one due to the limitations of illustration) each having an antenna so as to perform the satellite broadcast. Corresponding to these satellite broadcasts, an antenna 402, an integrated receiver decoder (IRD) 404, and a television receiver 406 are disposed at the home of the user able to receive satellite broadcasts in the subscriber unit 400 connected by radio to the antenna of the satellite broadcast use transmission device 312 in the transmission unit 300.

Further, the transmission unit 300 has a plurality of digital CATV use multiplexing devices 324 (only one is illustrated as a representative one due to the limitation of illustration), a plurality of digital CATV use modulators 328 (only one is illustrated as a representative one due to the limitation of illustration), and a plurality of digital CATV use transmission devices 332 (only one is illustrated as a representative one due to the limitation of illustration) so as to perform a cable broadcast, for example, a digital CATV broadcast. A CATV cable 340 is laid between the plurality of digital CATV use transmission devices 332 and the CATV receiving subscriber home in the subscriber unit 400. Corresponding to the digital CATV broadcast, in the CATV receiving subscriber home, an integrated receiver decoder (IRD) 414 and a television receiver 416 are disposed.

Note that, the integrated receiver decoder 404 disposed in the satellite broadcast receiving subscriber home and the integrated receiver decoder 414 disposed in the CATV receiving subscriber home are the same model, and the television receiver 406 disposed in the satellite broadcast receiving subscriber home and the television receiver 416 disposed in the CATV receiving subscriber home may be the same model too.

The transmission unit 300 is provided with a transmission system controller 350.

The transmission unit 300 is provided with a reception decoder 344 connected to the third routing switching circuit 302 and a television receiver 346. The reception decoder 344 and the television receiver 346 are for monitoring the signal processing performed in the integrated receiver decoder 404 and television receiver 406 in the transmission unit 300 or the integrated receiver decoder 414 and the television receiver 416 in the transmission unit 300. Namely, in the transmission unit 300, they are for monitoring the state of reception in the subscriber unit 400 by reproducing the contents equivalent to the received contents in the television receiver 406 or the television receiver 416 of the subscriber unit 400 at the television receiver 346.

The transmission system controller 350 controls the components in the transmission unit 300 mentioned above according to the on-line (real time) broadcast schedule and transmits the broadcast program to the subscriber unit 400.

The third routing switching circuit 302 receives the signals output from the near-video-on-demand (NVOD) play-out unit 200 or the signals output from the other program transmission units and outputs the program contents to the multiplexing device among a plurality of satellite broadcast use multiplexing devices 304 or a plurality of digital CATV use multiplexing devices 324 designated by the transmission system controller 350 according to the command of the transmission system controller 350.

Each of the plurality of satellite broadcast use multiplexing devices 304 multiplexes the signals input in a MPEG2-TS format in a format suited to the satellite broadcast. This multiplexed signal is modulated in a manner suited to the satellite broadcast by the corresponding modulator of the plurality of satellite broadcast use modulators 308. The result of modulation is transmitted from the satellite broadcast use transmission device 312 having the corresponding antenna to the antenna 402 of the subscriber unit 400. In the satellite broadcast receiving subscriber home, the transmitted program contents are received at the antenna 402 and demodulated at the integrated receiver decoder 404. The reproduced information is then output to the television receiver 406.

Note that, the transmission system controller 350 assigns the satellite broadcast use multiplexing device 304, the satellite broadcast use modulator 308, and the satellite broadcast use transmission device 312 to be used and causes them to operate by considering the capacity of the transponder (relay unit).

Each of the plurality of digital CATV use multiplexing devices 324 multiplexes the signals input in the MPEG2-TS format in a form suited to the digital CATV broadcast. This multiplexed signal is modulated in a manner suited to the digital CATV broadcast by the corresponding modulator of the plurality of digital CATV use modulators 328. The result of modulation is transmitted from the corresponding digital CATV use transmission device 332 to the integrated receiver decoder 414 of the subscriber unit 400 via the CATV cable 340. In the CATV receiving subscriber home, the program contents transmitted via the CATV cable 340 are received by the integrated receiver decoder 414 and demodulated and then the reproduced information is output to the television receiver 416.

The near-video-on-demand (NVOD) apparatus 1 of the embodiment of the present invention has the following advantages.

(1) In the near-video-on-demand (NVOD) apparatus 1 shown in FIG. 1 to FIG. 4, due to the above configuration and operation, the system configuration from the near-video-on-demand (NVOD) compilation unit 100 to the near-video-on-demand (NVOD) subscriber unit 400 is functionally divided. The overall processing is also is functionally and efficiently divided.

(2) The near-video-on-demand (NVOD) compilation unit 100, the near-video-on-demand (NVOD) play-out unit 200, the transmission unit 300, and the near-video-on-demand (NVOD) subscriber unit 400 can be respectively independently constituted and can independently operate. Accordingly, they can be produced with a high efficiency and can be easy connected when constructing a near-video-on-demand (NVOD) apparatus 1. Further, even if the need arises for a change of design or a change of hardware configuration in part of the configuration, for example, the near-video-on-demand (NVOD) play-out unit 200, the other parts of the configuration, for example, the near-video-on-demand (NVOD) compilation unit 100, will not be affected.

(3) The digital transmission format among the near-video-on-demand (NVOD) compilation unit 100, the near-video-on-demand (NVOD) play-out unit 200, the transmission unit 300, and the near-video-on-demand (NVOD) subscriber unit 400 is standardized and an interchangeability of signal processing and an enhancement of efficiency of signal processing are realized.

(4) The format for storing the AV signals is hierarchized to the first storage means comprising the record controller 114 and the archive storage 116 in the near-video-on-demand (NVOD) compilation unit 100, the second storage means comprising the near line storage 206 in the near-video-on-demand (NVOD) play-out unit 200, and the third storage means comprising the plurality of on-line storages 210 to 212 in the near-video-on-demand (NVOD) play-out unit 200, therefore storage of the AV signals of broadcast program for a long term, storage of the AV signals of the broadcast program for a medium term, and temporary storage of the AV signals for the on-line broadcast can be effectively carried out.

(5) It becomes easy to deal with changes in the broadcast programs etc.

(6) Promotions and CMs can be efficiently added.

(7) Code data can be efficiently inserted.

In the above embodiment, the description was made of the case where the near-video-on-demand (NVOD) compilation unit 100, the near-video-on-demand (NVOD) play-out unit 200, and the transmission unit 300 were disposed in one broadcasting station together, but it is not necessary to dispose them in the same broadcasting station.

Further, the case where the near-video-on-demand (NVOD) compilation unit 100, the near-video-on-demand (NVOD) play-out unit 200, and the transmission unit 300 were connected together was illustrated, but as apparent from the above configuration, it is also possible to constitute them as individual devices by prescribing the input conditions and output conditions of the apparatuses and operating them as described above. Namely, they can be independently constituted as the near-video-on-demand (NVOD) compilation apparatus, the near-video-on-demand (NVOD) play-out apparatus, and the transmission apparatus and can independently operate.

As the compression and encoding processing of the encoder 112 in the near-video-on-demand (NVOD) compilation unit 100, the case of using the MPEG2 standard was exemplified, but in the working of the present invention, it is not limited to the MPEG2 standard. Other various compression and encoding technologies, for example, the JPMEG and other compression and encoding technologies, can be applied as well.

Note that, in the above example, the description was made of the compression technology of the video signals and the compression technology of the audio signals without distinguishing between them, but the amounts of signals are different and in addition the natures of the signals are different, therefore the compression and encoding technology of the video signals and the compression and encoding technology of the audio signals are generally different. However, there is correspondence between these video signals and audio signals. Therefore the compression and encoding are carried out maintaining the correspondence thereof.

Application to Video-on-Demand (VOD) Apparatus

In the above embodiment, a near-video-on-demand (NVOD) apparatus was used as an example, but the present invention can also be applied to a video-on-demand (VOD) apparatus by enabling the broadcast of a plurality of programs to a plurality of channels instead of broadcasting a plurality of channels worth of video and audio signals for the same program on a staggered time basis, reproducing the video and audio signals required at the time requested from the subscriber unit, and enabling the transmission of same at that time.

Application to General Video and Audio Signal Editing and Transmitting Apparatus The present invention is also not limited to the near-video-on-demand (NVOD) apparatus and the video-on-demand (VOD) apparatus explained above and can be further applied to a general digital video and audio signal editing and transmitting apparatus such as for a broadcast system which provides a plurality of digital video and audio signals to the reception side by using a plurality of channels.

In the above embodiments, the case of broadcasting a program such as a movie in a video-on-demand (VOD) apparatus and a near-video-on-demand (NVOD) apparatus was explained as examples, but needless to say the present invention is not limited to the case of broadcasting video and audio signals of a movie and can be applied also to the case of transmitting video and audio signals of other matter.

According to the present invention, even the hardware (equipment) disposed in the broadcasting station is divided into the compilation unit, the play-out unit, and the transmission unit. Therefore, the processing is suitably dispersed, the overall hardware configuration is suitably assembled, and the hardware configuration is made flexible and simple so as to enable various requests and modifications to be handled. As a result, the units can be efficiently produced and easy connected together. Further, even if the need arises for a change of design, change of hardware configuration, etc. in part of the configuration, there is no effect on the rest of the configuration.

According to the present invention, the transmission format of the data is standardized throughout the entire video and audio signal editing and transmitting apparatus and interchangeability of the signal processing and an enhancement of efficiency of the signal processing are realized.

According to the present invention, further, the storage is hierarchized to the first storage means for storing the video and audio signals of the long term broadcast schedule, the second storage means for storing the video and audio signals of the medium term broadcast schedule, and the third storage means for temporarily storing the video and audio signals for the on-line broadcast, therefore the long term storage of broadcast programs, the medium term storage of broadcast programs, and the temporary storage of video and audio signals for the on-line broadcast can be effectively carried out.

According to the present invention, further, it is easy to deal with changes in the broadcast programs etc.

Further, according to the present invention, promotions and CMs can be efficiently added.

Further, according to the present invention, the code data can be efficiently inserted.

What is claimed is:

1. A video and audio signal editing and transmitting apparatus comprising:

a compilation unit which has a first storage means having a storage capacity in a range of several weeks to several months, receives video signals serving as video stock and audio signals corresponding to the video signals, which has an encoder that compresses and encodes the received video and audio signals and multiplexed packets of the compressed and encoded video and audio signals and code data in the form of code data packets, and which has a record controller that performs predetermined editing on the compressed and encoded video and audio signals and code data from the encoder to obtain a signal storage format for staggered playback of multiple channels, stores the edited results in the signal storage format in the first storage means, and transmits the compressed and encoded video and audio signals stored in the first storage means in accordance with a first transmission request;

a play-out unit which has a second storage means having a capacity in a range of several days to several weeks and third storage means constituting an on-line storage for temporarily storing the compressed and encoded video and audio signals and having a substantially smaller storage capacity than the storage capacity of the second storage means, receives the compressed and encoded video and audio signals transmitted from the compilation unit, initially stores the compressed and encoded video and audio signals received by the play-out unit in the second storage means, routes the compressed and encoded video and audio signals from the second storage means to the third storage means, reads and reproduces the compressed and encoded video and audio signals from the second storage means for feeding to the third storage means in accordance with a second transmission request, and which has code data insertion circuits for inserting the code data packets from the record controller into the reproduced compressed and encoded video and audio signals prior to transmission, and transmits the reproduced compressed and encoded video and audio signals from the third storage means; and a transmission unit which transmits the reproduced compressed and encoded video and audio signals transmitted from the play-out unit to subscribers according to a broadcast program.

2. The video and audio signal editing and transmitting apparatus according to claim 1, wherein said apparatus further comprises a subscriber unit having instruction means connected to the transmission unit for selecting a program to be received from the transmission unit and receiving means for receiving and decoding the video and audio signals transmitted from the transmission unit.

3. The video and audio signal editing and transmitting apparatus according to claim 1, wherein said compilation unit compresses and encodes said video and audio signals according to an MPEG standard.

4. The video and audio signal editing and transmitting apparatus according to claim 1, wherein said compilation unit receives input video and audio signals obtained by signal processing film stock or video and audio signals obtained by signal processing video stock recorded on video tape, performs compression and encoding on the video and audio signals, performs the predetermined editing to obtain a signal format suited to the broadcast program, and stores the same in said first storage means.

5. The video and audio signal editing transmitting apparatus according to claim 1, wherein the transmission of the compressed and encoded video and audio signals from said compilation unit to said play-out unit is carried out via a transmission line.

6. The video and audio signal editing and transmitting apparatus according to claim 1, wherein the transmission of the compressed and encoded signals from said compilation unit to said play-out unit is carried out via a recording medium on which the compressed and encoded signals are recorded.

7. The video and audio signal editing and transmitting apparatus according to claim 2, wherein:

said play-out unit copies continuous video and audio signals into a plurality of channels of video and audio signals, successively adds a predetermined time difference to said plurality of channels of the video and audio signals, and transmits a result to said transmission unit and said transmission unit transmits the plurality of channels of video and audio signals with the predetermined time difference to said subscriber unit.

8. The video and audio signal editing and transmitting apparatus according to claim 7, wherein said play-out unit has a promotion and commerical server for adding at least one of promotions and commericals to said plurality of channels of video and audio signals.

9. The video and audio signal editing and transmitting apparatus according to claim 2, wherein the transmission and reception between said transmission unit and said subscriber unit are carried out by using radio communication.

10. The video and audio signal editing and transmitting apparatus according to claim 2, wherein the transmission and reception between said transmission unit and said subscriber unit are carried out by using cable communication.

11. A video and audio signal editing and transmitting method for editing a program comprised by video and audio signals and transmitting the program to subscribers, comprising the following steps:

receiving video signals serving as video stock and audio signals corresponding to the video signals and compressing and encoding the received signals;

multiplexing packets of the compressed and encoded video and audio signals and packets of code data in the form of code data packets;

performing predetermined editing on the compressed and encoded video and audio signals to obtain a signal storage format for staggered playback of multiple channels and storing said video and audio signals in the signal storage format in first storage means having a storage capacity in a range of several weeks to several months;

transmitting the compressed and encoded video and audio signals stored in the first storage means in accordance with a first transmission request;

receiving the transmitted compressed and encoded video and audio signals and storing the video and audio signals in a second storage means having a storage capacity in a range of several days to several weeks;

routing the compressed and encoded video and audio signals from the second storage means to a plurality of online storage means for temporary storage, each of the line storage means having a smaller capacity than the storage capacity of the first or second storage means;

reading and reproducing the compressed and encoded video and audio signals from the plurality of online storage means in accordance with a second transmission request and transmitting the reproduced digital video and audio signals;

inserting the code data packets from the step of multiplexing into the reproduced compressed and encoded video and audio signals prior to transmission; and transmitting the transmitted reproduced video and audio signals to the subscribers according to a broadcast program.

* * * * *